US006569320B1

(12) United States Patent
Bedi et al.

(10) Patent No.: US 6,569,320 B1
(45) Date of Patent: May 27, 2003

(54) APPARATUS FOR CHANGING AN ENGINE FUEL FILTER

(75) Inventors: Ram D. Bedi, Bloomfield Hills; George R. Blundy, Ferndale, both of MI (US)

(73) Assignee: K.J. Manufacturing Co., MI (US)

( * ) Notice: Subject to any disclaimer, the term of this patent is extended or adjusted under 35 U.S.C. 154(b) by 0 days.

(21) Appl. No.: 09/586,198

(22) Filed: Jun. 2, 2000

(51) Int. Cl.[7] .................................... B01D 36/04
(52) U.S. Cl. .................... 210/94; 210/248; 210/257.1; 210/258; 210/259; 210/416.4; 210/424; 210/533
(58) Field of Search .......................... 210/248, 257.1, 210/258–260, 416.4, 424, 94, 196, 241, 416.1, 416.5, 533

(56) References Cited

U.S. PATENT DOCUMENTS

| | | | | |
|---|---|---|---|---|
| 858,441 A | * | 7/1907 | Clark | 210/313 |
| 2,902,161 A | * | 9/1959 | Humbert, Jr. et al. | 210/241 |
| 3,665,808 A | * | 5/1972 | Vestal | 417/399 |
| 3,929,645 A | * | 12/1975 | Bugelski et al. | 210/251 |
| 4,565,629 A | | 1/1986 | Wilson et al. | |
| 4,855,041 A | | 8/1989 | Church et al. | |
| 4,877,155 A | | 10/1989 | Tull | |
| 5,132,009 A | | 7/1992 | Futa, Jr. et al. | |
| 5,413,716 A | * | 5/1995 | Osborne | 210/787 |
| 5,526,782 A | | 6/1996 | Bedi et al. | |
| 5,546,979 A | | 8/1996 | Clark, II et al. | |
| 5,547,565 A | | 8/1996 | Biere et al. | |
| 5,588,502 A | | 12/1996 | Bedi et al. | |
| 5,837,132 A | | 11/1998 | Hurner | |
| 6,022,473 A | * | 2/2000 | Mickelson | 210/86 |

* cited by examiner

*Primary Examiner*—Matthew O. Savage
(74) *Attorney, Agent, or Firm*—Young & Basile, P.C.

(57) ABSTRACT

A fuel collection and rehabilitation device for use in connection with diesel engines, the diesel engine having a fuel filter having an interior volume for containing fuel therein. The fuel collection and rehabilitation device having conduits for releasable fluid communication with the interior volume. A pumping device selectively moves the fuel from the fuel filter to a collection receptacle and then through a filtration device. The fuel then can be selectively routed back to the fuel filter connected to the diesel engine.

6 Claims, 2 Drawing Sheets

APPARATUS FOR CHANGING AN ENGINE FUEL FILTER

FIELD OF THE INVENTION

The present invention is directed to a method and apparatus for changing an engine fuel filter, particularly in diesel engine configurations.

BACKGROUND OF THE INVENTION

Diesel engine filters must be routinely changed to insure proper function of the associated engine. These devices tend to hold significant quantities of residual fuel. The filters need to be removed and replaced periodically to ensure proper engine performance.

Removal of diesel engine filters is an opportunity for spillage of the fuel which is contained in the filter housing. This poses a risk of environment contamination and, can jeopardize worker safety. Thus the filter units to be changed or removed must be handled carefully to minimize these risks. This can add time and complexity to the filter change operation and does not completely eliminate the risks outlined and associated with filter change operations.

Additionally, in large diesel engines, the fuel filter can contain several ounces of fuel. The fuel in the filter is, typically mixed with water and/or other contaminating materials. If this material is discarded indiscriminately, it can cause environmental degradation. Even if the material is disposed of in an environmentally friendly manner, the fuel value of this petroleum product is lost or severely compromised. At best, the material is collected for recycle and/or use as a lower-grade petroleum product. All too often, significant quantities of the fuel contained in a diesel engine fuel filter remain in the filter, creating filter disposal problems. It would be advantageous if this material could be captured in some manner and reused in the fuel system of the associated vehicle. It would also be advantageous if the spent filter could be drained in an efficient manner so that little or no fuel remains in the filter to be discarded.

Heretofore various attempts have been made to address and overcome the problems associated with changing engine fuel filters. In U.S. Pat. No. 5,546,979 to Clark et al., the fuel contained in fuel filter is removed by a suction hose attached to the bottom of the filter. However, the Clark reference uses a drill bit to puncture the filter to establish the channel through which the fluid can be removed. Such puncture renders the filter useless for any reclaim and/or refurbishment. Additionally, there is no provision for recapture and reuse of the collected fuel in the associated automotive environment. Finally, because of the manner and location of the puncture, it is difficult to remove all fuel contained in the spent filter.

It should also be noted that, due to the typical volume of the diesel fuel filter, the newly positioned replacement filter must be charged with a suitable volume of fuel before maximum engine efficiency and fuel usage can be achieved. Thus fuel filter changes can also necessitate the additional step of charging the fuel filter with a volume of diesel fuel after the filter is in position. Devices such as that disclosed in the Clark reference fail to address the problem of fuel charging after the new filter is in place.

The problem of inadvertent spillage has been discussed in references such as U.S. Pat. No. 4,877,155 to Tull directed to a spill protection apparatus. In the device disclosed in Tull, fluid inadvertently spilled during a filter change is collected by an overreaching sleeve and conveyed to an appropriate retention basin. The reference fails to teach or suggest the reuse of such material in a diesel engine. Furthermore, the Tull reference fails to teach or suggest direct collection of all fuel contained in the spent filter.

References such as Hurner (U.S. Pat. No. 5,837,132) disclose a fuel system which includes a sight glass for observing and monitoring fluid flow. The Hurner reference also teaches the use of a drain valve or spigot to remove unwanted debris or the like from the bottom of a fuel filter. The Hurner reference fails to teach or suggest a device which could be employed to drain fuel from a filter and collect the material for dewatering and reuse.

Futa (U.S. Pat. No. 5,132,009) discloses a filter device for fuel systems in which outlet and inlet ports can be closed to prevent fluid loss during the removal and change of a fuel filter. The device disclosed in Futa is a completely on-board system. The system disclosed in Futa lacks any teaching which would suggest the ability to remove fluid from the filter prior to fuel filter change in a manner which permits dewatering the fuel to recycle and reuse of the removed fluid after the filter change operation has been completed.

Thus it would be desirable to provide a fast and efficient method for removing engine fuel from the filter prior to the filter element change operation and replacing the fuel after replacement of the filter element. It would be desirable to provide a method and device through which the fuel, which is removed prior to the engine fuel filter element replacement, can be subjected to suitable cleaning and/or dewatering steps. It would also be desirable to provide a method and device which would provide for the removal and replacement of the fuel filter element in a completely self-contained and efficient manner.

SUMMARY OF THE INVENTION

The present invention is directed to a method and apparatus for facilitating engine fuel filter change operations. In the present invention, a fuel filter is positioned on and in fluid communication with an appropriately configured mount. The mount has a suitable quick connect device in fluid communication with a suitable outlet of the associated fuel filter. The quick connect device is releasably attachable to a mating quick connect member. The mating quick connect member is in fluid communication with an externally positioned fuel collection and rehabilitation system.

The external fuel collection and rehabilitation system of the present invention includes a receptacle or reservoir into which fuel present in the fuel filter can be drawn or collected. Preferably, the receptacle is associated with a suitable piston-actuated device which can draw a vacuum on to the fuel filter through the associated mounting bracket and quick-connect coupling members to withdraw fuel therefrom.

The external receptacle or reservoir can also include means for removing any excess water which may be present in the fuel contained therein. In the preferred embodiment, the device includes a closable spigot in fluid communication with the interior of the receptacle.

The external fuel collection and rehabilitation device has an appropriate two-way valve which can be positioned in either a first fuel filling position or a second fuel filtering position. When in the second position, the two-way valve provides fluid connection between the fluid receptacle and recycling filter associated with, or mounted on, the external device. Means for conveying the fuel through the filter are also part of the external fuel removal and rehabilitation device.

The device of the present invention also includes means for conveying filtered, collected fuel back to an associated engine. In the preferred embodiment, when fuel filtration and return to the associated engine are required, the fuel return means includes a suitable actuated piston plunger. This piston may be powered by hand, air or hydraulic operated cylinder. Such a plunger can be depressed and fuel conveyed through the filter, back through the external suction hose, the part of the hose used for both suction and fill of the diesel fuel filter, and into the onboard fuel filter. Once the fuel has been returned, the device can be decoupled and the automobile returned to appropriate service.

DESCRIPTION OF THE DRAWINGS

In order to more fully understand the present invention, the following drawing is presented in which like reference numbers are use throughout the various drawing figures and in which.

BRIEF DESCRIPTION OF THE PREFERRED EMBODIMENT

The device of the present invention provides a quick and effective system for removing fuel from an associated diesel fuel filter in a manner which renders the fuel filter essentially free of fluid fuel prior to removal of the fuel filter from engagement with the associated engine fuel which could potentially spill or leak when the fuel filter is removed from engagement with the engine is contained in an environmentally safe manner during filter change operations. The device of the present invention permits safety to the environment as well as the operator and, potentially, more rapid removal and reprocessing of the contaminated fuel contained in the filter as well as minimizing the chance of worker exposure to the fuel or accidental discharge to the surrounding environment.

Additionally, the device of the present invention provides an integrated, self-contained means for the removal, collection and/or return of diesel fuel to an engine fuel filter during filter change operations. Because the fuel removal and return operations are relatively easy and self-contained, it is envisioned that the device will facilitate and streamline fuel filter change procedures. This should result in cost savings per filter change operation.

It is also anticipated that the device of the present invention will provide a means for rehabilitating diesel fuel filters in a manner which potentially could forestall the need for complete filter changes. The device of the present invention makes it possible to remove the fuel contained in the fuel filter along with a significant portion of the contaminants contained therein. This material can be passed through the water separating fuel filter present in the device of the present invention and returned to the original engine-mounted fuel filter unit in the manner to be described to alleviate dry starts (hard starts) subsequently. It is envisioned that, in certain instances, this will permit the continued use of the existing filter for an additional interval.

Ultimately it is envisioned that easy and rapid engine fuel filter change or cleaning procedures will also result in greater willingness to obtain more frequent filter changes and/or cleanings which should have salutary effects on engine wear and longevity.

Figure 1:
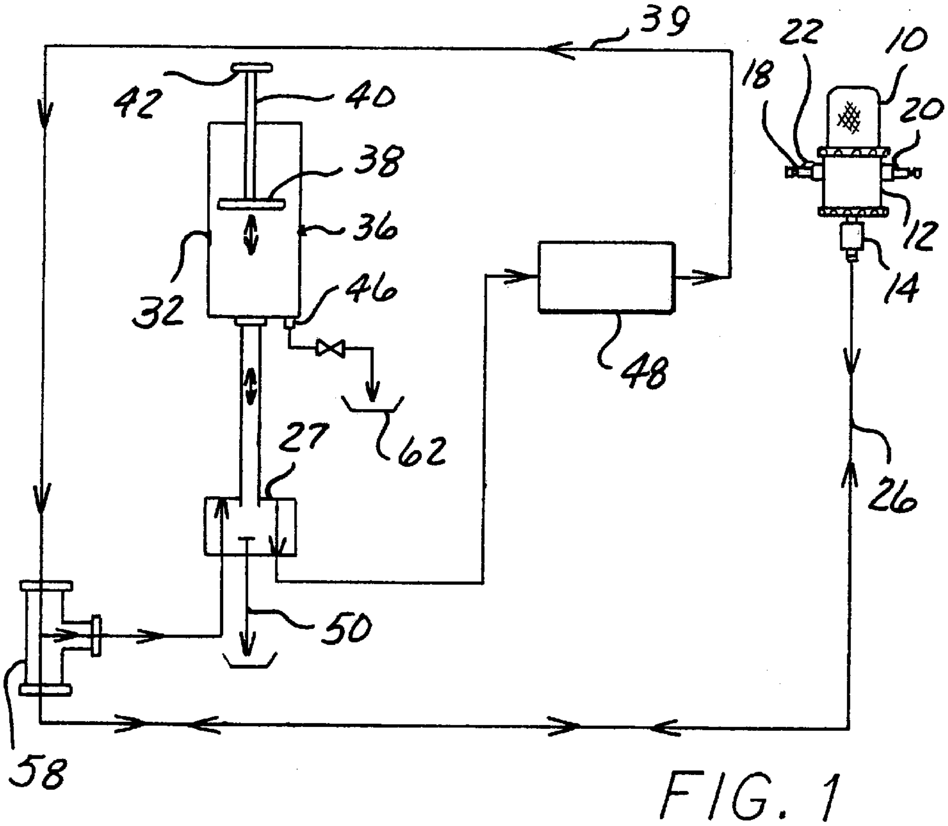
FIG. 1 is a schematic diagram of the device of the present invention in releasable contact with a diesel engine oil filter.

The device of the present invention is depicted schematically at FIG. 1 as including a fluid circuit defined, at least in part by conduit 26, valve 27, reservoir 32, filter 48 and line 30. FIG. 1 also shows that the fluid circuit can be include by a first portion defining a loop including valve 27, line 39, reservoir 32, filter 48, and T-connector 58, as well as a second portion defining a conduit, such as conduit 26. In its broadest sense, a diesel engine fuel filter 10 is mounted along a fuel conveyance line on a suitable boss or bracket 12 which is equipped with one half of a suitable quick connect coupling member 14. The coupling member 14 can be disposed adjacent the fuel filter 10 along the fuel conveyance line at a first position in fluid communication with the interior of the fuel filter 10. Thus the coupling member 14 may be placed in a preexisting drain 16 located proximate to the lowest end of the mounting boss 12 and providing fluid egress for a fluid stream through the boss 12 from the interior of the fuel filter 10. Alternately, an additional drain opening can be produced in the mounting boss 12 (not shown).

Figure 2:
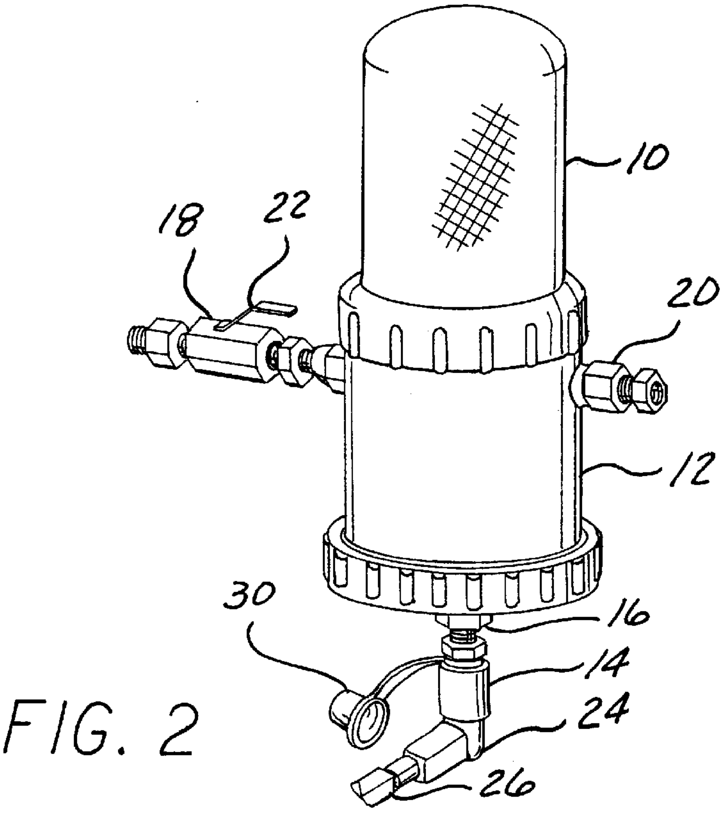
FIG. 2 is a perspective view of the mounting bracket of the present invention with an engine fuel filter attached thereto.
Figure 3:
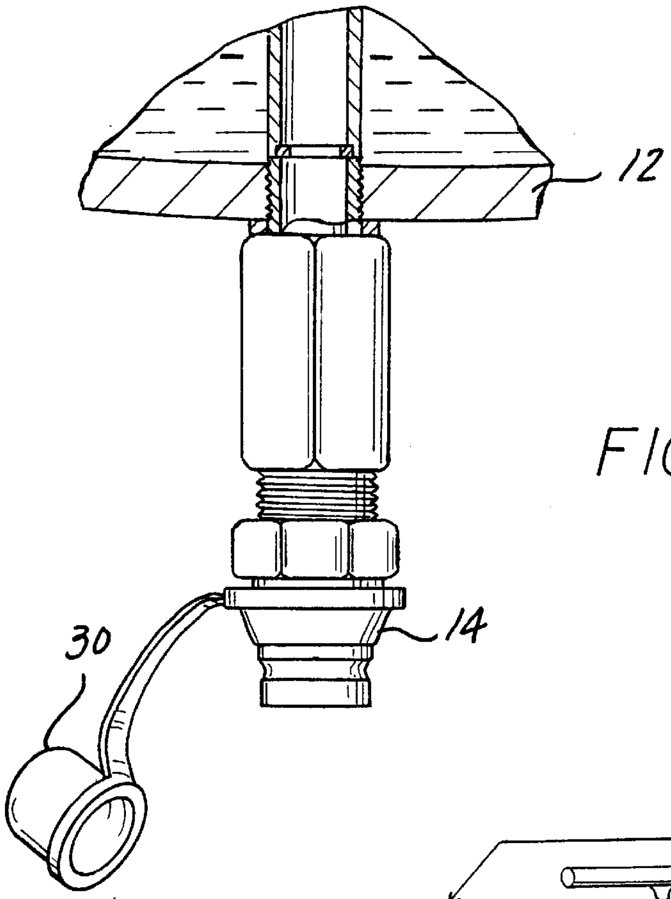
FIG. 3 is a detail view of the lower face of the mounting bracket of FIG. 2 in the decoupled state.

As shown most clearly in FIG. 3, the mounting boss 12 also includes a fuel ingress conduit 18 which permits conveyance of fuel into the fuel filter 10 during normal operation of the associated engine. The mounting boss 12 also has a fuel egress conduit 20 which conveys fuel away from the fuel filter 10 during normal engine operation. The mounting boss 12 also includes means for isolating the fuel filter from the fuel supply source during filter change or rehabilitation. Such isolation means can be located anywhere in the fuel conveyance line where suitable and appropriate. As depicted in FIG. 2, the isolation means is a suitable valve 22 located in the fuel ingress conduit 18 proximate to the mounting boss 12.

The quick connect non-spill coupling member 14 employed in the device of the present invention is capable of releasably receiving a suitable mating non-spill coupling member 24 connected to a hose or other suitable conduit 26. The conduit 26 is in fluid communication with an external fuel removal and rehabilitation device 28 which is described in greater detail subsequently. A suitable removable cap 30 may also be attached to the quick connect coupling member 14 to cover and protect it when not in use. It is understood that the quick connect non-spill coupling member 14 has an access port that is sealed when not connected to the mating non-spill coupling member 24.

Figure 4:
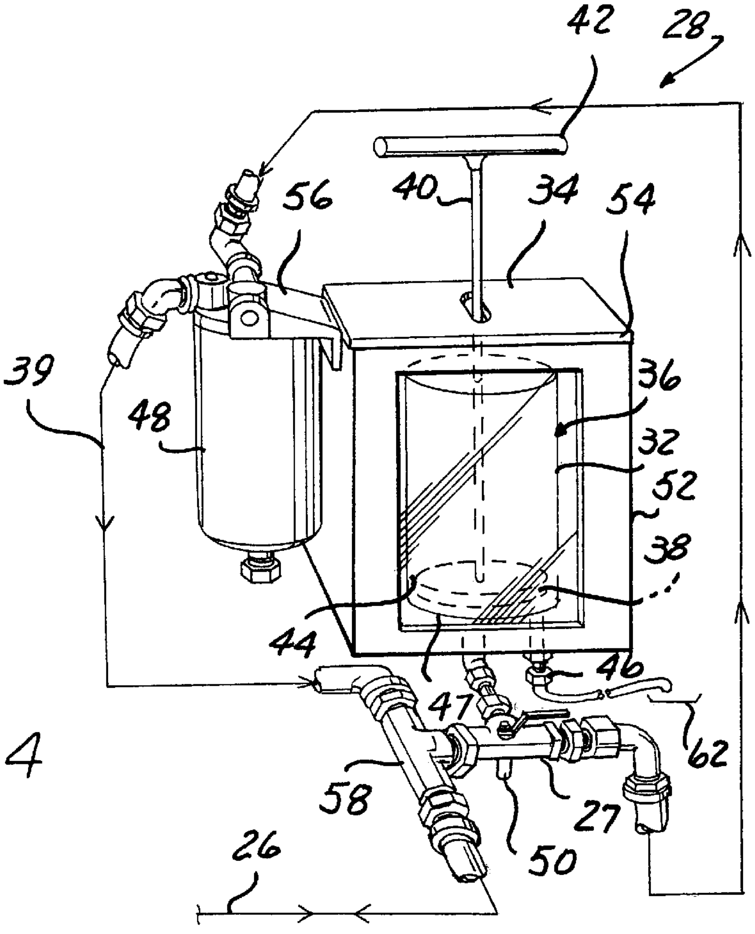
FIG. 4 is a perspective view of the fuel removal and rehabilitation device of the present invention decoupled from the associated diesel fuel filter.

The external fuel removal and rehabilitation device 28 of the present invention is depicted in FIG. 4 and comprises means for drawing fuel from the filter 10 through the hose 26 into an external holding reservoir or receptacle such as a transparent cylindrical reservoir 32 contained in housing 34. In the preferred embodiment, the external holding reservoir is piston actuated device such as is shown in FIG. 1 at 36.

The piston-actuated device 36 of the preferred embodiment generally comprises the cylindrical reservoir and a movable piston 38 in fluid-tight communication therein. The movable piston is connected to a suitable arm 40 which can be used to move the piston 38 relative to the cylinder, increasing or decreasing the volume in the cylinder. In the preferred embodiment, the arm 40 extends to a position exterior to the housing 34 and is suitably attached to manually operated handle 42 or to a hydraulically operated piston (not shown) attached thereto. The preferred piston actuated device is one which can be hand, hydraulically or air actuated.

The reservoir or receptacle 32, preferably, includes means for permitting visual assessment of the removed fuel such as a transparent face 44. Such a face can permit the operator to ascertain the condition of fuel removed from the filter. Such visual inspection can provide the operator the level of water contaminant. It is anticipated that the reservoir/receptacle 32 is preferably cylindrical and can be configured of any suitable transparent material throughout the cylindrical portion of its body. The reservoir or receptacle 32 also has a suitably oriented drain 46 located in the lower oriented face 47 to facilitate removal of sediment and water as required or desired.

As shown in the drawing Figures, the fuel removal and rehabilitation device 28 has a suitable routing valve 27 or other suitable directional means which can be oriented in a first fuel removal position and a second fuel replacement position. When in the fuel removal position, the T-valve 27 provides an open conduit from the engine mounted fuel filter 10 to the piston/reservoir 36 to draw a quantity of fluid from the fuel filter associated with the fuel conveyance line. Once the fuel has been drawn out of the filter 10, the drained fuel filter 10 can be removed and replaced as desired or required. The valve 27 can be reoriented into the second position and piston 38 depressed, forcing the fuel through an associated fuel filter unit 48, into and through line 39 and back into the engine fuel filter through hose 26 to return the quantity of fluid to the fuel conveyance line. As stated above, the fuel filter can be replaced after the quantity has been drawn and the quantity can alleviate dry starts by charging a new, or second filter. Alternatively, the quantity can be returned to the existing filter to permit continued use of the existing filter. Thus, the fluid stream can selectively move in opposite directions with respect to the conduit 26 and the coupling member 14. Once the fuel has been returned, the quick connect non-spill coupling members 14, 24 can be disconnected from one another. The isolation valve 22 set to the open position and normal engine operations is resumed. Once the fuel has been returned, the quick connect non-spill coupling members 14, 24 can be disconnected from one another. The isolation valve 22 set to the open position and normal engine operations is resumed.

The associated filter unit 48 is, preferably, contained within housing 34 and is maintained in permanent connection to the reservoir of receptacle 32. Alternately, the associated filter until 48 can be located at a suitable position external to housing 34 as would be the case with a multi-use filter device or the like. Instances where the associated filter unit 48 is located external to the housing 34, it is anticipated that connection between the associated filter unit 48 and the receptacle 32 will be of a detachable nature, accomplished by quick connect fittings or the like.

The associated filter unit 48, whether connected to the housing 34, or located external thereto, will contain suitable filtration media capable of removing contaminants from hydrocarbon materials such as diesel fuel. Such filtration media may comprise one or several different materials as required to accomplish suitable fuel filtration. It is anticipated that such filtration media will be capable of removing contaminants such as by-products of incomplete combustion of the diesel fuel as well as contaminants derived from the engine itself. Such contaminants include, but are not limited to, metallic or metal-base materials which result from the engine operation and parts contained therein. Other contaminants may include components derived from engine lubricants, seals and gaskets, and the like. Additionally, the filtration media contained in the associated filter unit 48 can be one which is capable of removing or sequestering various contaminants derived from the external environment such as road dirt particles and the like. Filtration media capable of such functions are known to those skilled in the art.

The filtration media employed in associated filter unit 48 may be of a type which is removable from the associated filter unit on a periodic basis when the media becomes saturated or unable to provide suitable filtration function. Alternately, it is considered within the purview of this invention that the entire filter unit with filtration media contained therein will be removable from the fuel rehabilitation device 28 to permit replacement with a fresh filter unit 48.

Generally, the associated the filter unit 48 will have an interior volume sufficient to contain an amount of filtration media sufficient to achieve the desired level of fuel filtration and/or purification. It is anticipated that the filtration media will remain active through multiple iteration of fuel purification and/or filtration. Generally, the volume of the associated filter unit 48 will be one which will permit the efficient and rapid filtration of the fuel passing through the filter upon discharge from the receptacle 32.

In the preferred embodiment, the receptacle 32 also include means for removing sediment and/or aqueous material from fuel contained in the receptacle 32. As indicated previously, suitable means include a water separation device such as drain 46 located in the lower oriented face 47 of the receptacle 32. In the embodiment as shown, the water separator is a manually operated drain, spigot or valve which can be opened to remove a lower layer of fluid from the receptacle. It is also to be considered within the purview of this invention that the water separator device could be automated. In an automated version of the water separator device, it is anticipated that the device would have suitable automatically actuated valves to permit egress of the desired material. Additionally, it is anticipated that the water separator device would be equipped with appropriate sensors and feedback means to analyze the material passing from the receptacle to ensure removal of the target material such as water and retention of the desired fuel material. At minimum, the water separator device 46 incorporates a drain which permits removal of gross contaminants in a rapid and efficient manner. Such removal can prevent large quantities of these materials from entering the filtration means. This advantageously increases the useful life of the filtration media contained in filter unit 48.

In the present invention, the fuel removal and rehabilitation device 28 is equipped with a suitable routing valve 27 or other directional means to permit and treat of the fuel into receptacle 32 and, subsequently, permit routing of the material through suitable filtration media as required or desired. In the preferred embodiment, the routing valve 27 is a three-way valve which is either manually or automatically moveable between an initial position which provides fluid contact between the engine fuel filter 10 and the reservoir of receptacle 32 and a second position which provides fluid communication between the receptacle and the associated filter unit 48. If necessary, the routing valve 27 can be connectable with a third outlet 50 which would permit removal of fluid drawn into and contained within with receptacle 32. In this third position, material which is deemed to degrade it or pollute it to be filtered and return to the associated diesel engine could be purged from the receptacle 32 without entering the filtration unit. It is envisioned that such material would be evacuated in an environmentally secure manner to a suitable collection device or disposal means. In this manner, material which is inappropriate for filtration and reuse could be handled quickly and efficiently during the filter change operation.

It is also within the purview of this invention to provide suitable sampling and analysis devices in fluid communication with the rehabilitation device 28 to provide the operator with a more detailed chemical and/or physical analysis of the material withdrawn from the diesel filter unit.

The housing 34 of the present invention can be any suitably configured container which can hold the receptacle 32 in a suitably visible fashion. As depicted in FIG. 4, the housing is an essentially rectangular box 52 having an upper lid 54 through which the piston actuated pump arm 40 can extend. The box 52 also has a plurality of apertures positioned to permit access for the various conduits and drain device. As shown in FIG. 4, the associated filtration unit 48 is mounted to the exterior surface of the box 52 by a suitable mounting box 56. In this manner, the filtration device can be readily serviced and removed as necessary.

The external fuel removal and rehabilitation device 28 of the present invention can include suitable means for moving the device to the desired location. It is within the purview of the invention that, the device 28 of the present invention can be mounted on a suitable frame which include appropriate wheels to facilitate movement. The device can also include suitable auxiliary reservoirs such as reservoir 62 to collect and contain aqueous material which is dewatered from the cylinder.

FIGS. 1 and 4 show the fuel removal and rehabilitation system as a closed-loop system in that a T-connector 58 can direct the diesel fuel from the fuel filter 10 to the cylindrical receptacle 32 and also direct the diesel fuel from the filtration unit 48 back to the fuel filter 10. The T-connector 58 also provides a means for recirculating or directing the previously filtered diesel fuel through the filtration device more than one time. It is also conceivable that the fuel removal and rehabilitation system can be an open-loop system which eliminates the T-connector 58 and replaces it with a continuous conduit from the fuel filter 10 to the 3-way directional valve 27. Another conduit may lead from the filtration unit 48 to a reservoir or other storage container for the refurbished fuel.

While the invention has been described in connection with what is presently considered to be the most practical and preferred embodiment, namely a fuel transfer and rehabilitation device for use in connection with diesel engines, it is to be understood that the invention is not to be limited to the disclosed embodiments but, on the contrary, is intended to cover various modifications and equivalent arrangements included within the spirit and scope of the appended claims. For example, the transfer and rehabilitation system of the present invention can be utilized for any fluid system, such as an hydraulic system, which incorporates a filter.

What is claimed is:

1. A fuel rehabilitation device comprising:

means for establishing releasable fluid communication with an interior volume of an engine-mounted diesel fuel filter;

a first conduit affixed to the releasable communication means for conveying diesel fuel contained in the interior volume of the engine-mounted diesel fuel filter out of the fuel filter;

a collection receptacle in fluid communication with the fuel conveying conduit, the collection receptacle having a plurality of walls and located external to the automotive vehicle associated with the engine-mounted diesel fuel filter, wherein one of said walls includes a first flow opening, the collection receptacle including a pump device for drawing fuel into the receptacle through said first opening;

a filtration device in fluid communication with the collection receptacle, the filtration device capable of sequestering at least a portion of contaminants contained in the diesel fuel present in the collection receptacle;

a routing valve;

a second conduit for conveying diesel fuel away from the filtration device connecting said first flow opening to said routing valve;

a third conduit connecting said routing valve to an inlet opening of said filtration device;

a fourth conduit connected to an outlet opening of said filtration device;

a fifth conduit connected to said routing valve;

connection means for connecting together said first conduit, said forth conduit and said fifth conduit;

wherein said routing valve has a first position for drawing fuel from said engine mounted fuel filter through said first conduit, through said connection means, through said fifth conduit, through said routing valve, and into said receptacle through said second conduit; and wherein said routing valve has a second position for directing fuel through said second conduit from said receptacle, through said routing valve, through said filtration device, through said third conduit, through said forth conduit, through said connection means, and back to said engine mounted diesel fuel filter through said first conduit.

2. The fuel transfer and rehabilitation device for use in connection with recovery of diesel fuel contained in engine mounted diesel fuel filter of claim 1, having an interior volume, the fuel collection and rehabilitation device comprising:

means for establishing releasable fluid communication with the interior volume of the engine mounted diesel fuel filter;

a conduit affixed to the releasable communication means for conveying diesel fuel contained in the interior volume of the engine mounted diesel fuel filter out of the fuel filter;

a collection receptacle having a connection to and in fluid communication with the fuel conveying conduit, the collection receptacle having a plurality of walls and located external to the automotive vehicle associated with the engine mounted diesel fuel filter, the collection receptacle being capable of receiving diesel fuel conveyed through the conduit;

a filtration device in fluid communication with the collection receptacle the filtration device capable of sequestering at least a portion of contaminants contained in the diesel fuel present in the collection receptacle;

a second conduit for conveying diesel fuel away from the filtration device; and a pump device connected to the collection receptacle and capable of effecting removal of diesel fuel contained in the engine-mounted diesel fuel filter through the conduit into the collection receptacle;

wherein the Pump device is defined by the collection receptacle having at least one wall moveable relative to another wall, said collection receptacle has an interior volume which is variable according to a position of said movable wall.

3. The fuel transfer and rehabilitation device of claim 2 further comprising a drain in fluid communication with the interior of the collection receptacle for draining water from the receptacle, the drain terminating at a point external to the collection receptacle; and means for opening and closing the drain as desired.

4. The fuel transfer and rehabilitation device of claim 1, further comprising a housing for containing the collection receptacle.

5. The fuel transfer and rehabilitation device of claim 4, wherein said housing and said collection receptacle are at least partially made of a transparent material to provide visual access to diesel fuel in the collection receptacle.

6. The fuel transfer and rehabilitation device of claim 1 wherein the pump device comprises a reciprocal piston in a cylinder.

* * * * *